H. J. BROWN.
CUT-OUT FILM BLANKET STRIP FOR AUTOGRAPH CAMERAS.
APPLICATION FILED MAR. 30, 1915.
1,212,447. Patented Jan. 16, 1917.
Fig. 1.
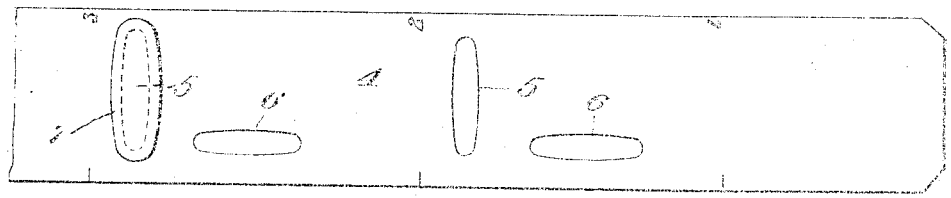
Fig. 2.
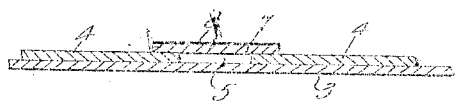
Fig. 3.
Inventor
Henry J. Brown
By Frederick V. Winters
Attorney

UNITED STATES PATENT OFFICE.

HENRY J. BROWN, OF NEW YORK, N. Y.

CUT-OUT FILM BLANKET-STRIP FOR AUTOGRAPH-CAMERAS.

1,212,447.                    Specification of Letters Patent.    Patented Jan. 16, 1917.

Application filed March 30, 1915. Serial No. 18,098.

*To all whom it may concern:*

Be it known that I, HENRY J. BROWN, a subject of the King of England, residing at New York, in the county of Bronx and State of New York, have invented certain new and useful Improvements in Cut-Out Film Blanket-Strips for Autograph-Cameras, of which the following is a full, clear, and exact specification.

This invention relates to autograph cameras, and especially to the films used with such cameras. Cameras of this kind are provided with openings in the back portions of their casings, substantially as disclosed in my pending application, filed February 6, 1915, Ser. No. 6568 for permitting an inscription on a transparent plate fitted in said opening to be printed upon the film at the time or immediately after each picture is taken. Films now in general use are mounted upon blanket strips which extend along the back of the films and project beyond the ends thereof for attachment to the winding spools in the cameras.

The object of the present invention is to provide a blanket strip for films which will permit the printing of inscriptions on the film from the back of the camera.

The invention will be first hereinafter described in connection with the accompanying drawings, which constitute a part of this specification, and then more specifically defined in the claims at the end of the description.

In the accompanying drawings, wherein similar reference characters are used to designate corresponding parts throughout the several views: Figure 1 is a plan view of a portion at one end of a blanket strip constructed in accordance with this invention, Fig. 2 is an edge view of the blanket strip and film, part of the strip being shown in section and Fig. 3 is an enlarged broken section through a film and slotted blanket strip, the latter having a covering for the slot coated with a substance which may be displaced to permit light to penetrate when scratched with a pointed instrument.

The film 3, which when in use is wound off of one spool of a camera and onto another in the well-known manner, is located just within the back of the camera casing, the blanket strip 4 being interposed between the film and the back of the casing.

The blanket strip is made of paper which is prepared in such a way as to prevent light from passing through it, in order to avoid clouding or fogging of the film by reason of light which may filter through the back of the casing. Said blanket strip is also used for supporting the film in its travel from one spool to the other in the camera, and for attachment to the spools without danger of exposing the film. From the nature of the blanket strip, it will be seen that if it is made imperforate, it will prevent the printing of autograph inscriptions on the back of the film through the opening 2. I, therefore, propose to provide the blanket strip with slots or openings 5 and 6, at suitable intervals for registering with the autograph printing openings in the backs of camera casings. As illustrated in Figs. 1 and 2, the openings 5 extend across or transversely of the strip near the ends of the several sections of the film, and are designed to be used with an autograph printing opening in the back of a camera for placing the autograph inscription at the end of each film section or picture. The openings 6 extend longitudinally of the blanket strip and are arranged about midway between the ends of the respective film sections, and are designed for printing the inscriptions along the lateral edge portions of the pictures, as when the pictures are taken when the camera is on its side. It will be understood, of course, that the camera may be provided with a second autograph printing opening arranged longitudinally near one edge and about midway between the end of the back of the casing, with which longitudinal opening the slots 6 in the blanket strip will register consecutively as the film and strip are fed from one spool to the other. It will thus be seen that when each film section is in position for taking a picture from the front of the camera, the slots 5 and 6 in the blanket strip will be in position to register with the transverse and longitudinal autograph printing openings in the back of the camera, so that either of said openings may be utilized for marking or inscribing the film section, according to the position of the camera when the picture is taken, the transverse opening 2 and slot 5 being used when the picture is taken with the camera arranged on end, and the longitudinal printing opening (not shown) and slot 6 being used when the picture is taken with the camera resting on its side.

The shape of the slots 5 and 6 may be varied as desired, the oval or elliptical form illustrated being only one of many designs which may be used. The slots 5 and 6 may be covered on the outside with suitable paper 7, gummed to the outside of the blanket strip, said paper to be coated or treated with a solution or substance 8, Fig. 1 which when scratched with a pointed instrument will permit light to penetrate for printing an autograph inscription on the film.

Having thus described my invention, what I claim as new and desire to secure by Letters Patent of the United States is:

1. An opaque blanket strip for photographic films, having a transverse slot along the end and a longitudinal slot along the side of each film section, for the purpose specified.

2. The combination, with an opaque blanket strip for photographic films said blanket strip having slots therein for autograph printing from the back of the camera, of pieces of paper covering said slots and having an opaque coating preparation which may be displaced to permit light to penetrate when scratched with a pointed instrument.

In testimony whereof I have signed my name to this specification.

HENRY J. BROWN.